US012798597B2

(12) United States Patent
Ramaprasad et al.

(10) Patent No.: US 12,798,597 B2
(45) Date of Patent: Nov. 17, 2026

(54) IN-CABIN PRESENCE DETECTION

(71) Applicant: Analog Devices International Unlimited Company, Limerick (IE)

(72) Inventors: Mukund Ramaprasad, Wilmington, MA (US); Adarsh Gopalakrishnan, Wilmington, MA (US); Sivaramakrishnan Subramanaiam, Wilmington, MA (US); Harvey Weinberg, Wilmington, MA (US)

(73) Assignee: Analog Devices International Unlimited Company, Limerick (IE)

( * ) Notice: Subject to any disclaimer, the term of this patent is extended or adjusted under 35 U.S.C. 154(b) by 257 days.

(21) Appl. No.: 18/020,243

(22) PCT Filed: Aug. 6, 2021

(86) PCT No.: PCT/EP2021/072105
§ 371 (c)(1),
(2) Date: Feb. 7, 2023

(87) PCT Pub. No.: WO2022/029333
PCT Pub. Date: Feb. 10, 2022

(65) Prior Publication Data

US 2023/0303103 A1 Sep. 28, 2023

Related U.S. Application Data

(60) Provisional application No. 63/062,637, filed on Aug. 7, 2020.

(51) Int. Cl.

| | |
|---|---|
| ***B60W 50/14*** | (2020.01) |
| ***G08B 21/22*** | (2006.01) |
| ***G10L 19/02*** | (2013.01) |
| *B60W 50/00* | (2006.01) |

(52) U.S. Cl.
CPC ............ *B60W 50/14* (2013.01); *G08B 21/22* (2013.01); *G10L 19/02* (2013.01); *B60W 2050/0057* (2013.01)

(58) Field of Classification Search
CPC ......... B60W 50/14; B60W 2050/0057; B60W 2040/0881; B60W 2050/143;
(Continued)

(56) References Cited

U.S. PATENT DOCUMENTS 7,031,474 B1 * 4/2006 Yuen ........................ H04S 1/005 381/1
2004/0267148 A1 * 12/2004 Arand .................... A61B 5/352 600/513
(Continued)

FOREIGN PATENT DOCUMENTS

DE 10 2017 124 291 A1 4/2018
JP 2001047926 A * 2/2001
(Continued)

OTHER PUBLICATIONS

International Search Report issued in corresponding International Application No. PCT/EP2021/072105 dated Nov. 25, 2021.
(Continued)

*Primary Examiner* — Erin M Piateski
*Assistant Examiner* — Hajar Hassaniardekani
(74) *Attorney, Agent, or Firm* — ArentFox Schiff LLP

(57) ABSTRACT

A vehicle includes microphones and a system for detecting a lifeform in the vehicle, such as a pet or child left behind in a vehicle. Detecting the lifeform includes obtaining sound signals captured by the microphones and performing a spectral response analysis of the sound signals. The spectral response analysis is based on frequency-based attenuation of the vehicle. The lifeform detection system determines, based on the spectral response analysis, whether a source of a
(Continued)

sound captured by at least one of the plurality of microphones is located inside the vehicle, and if it is, generates a notification in response to determining that the source of the sound is located inside the vehicle.

19 Claims, 5 Drawing Sheets

(58) Field of Classification Search
CPC ... B60W 2420/54; B60W 40/08; G08B 21/22; G08B 21/24; G10L 19/02; G10L 25/18; G10L 25/51; B60H 1/00757; B60H 1/00978; B60H 1/00742; G01S 5/18; G01V 1/001
See application file for complete search history.

(56) References Cited

U.S. PATENT DOCUMENTS

| | | | | |
|---|---|---|---|---|
| 2011/0074565 | A1 | 3/2011 | Cuddihy et al. | |
| 2012/0050021 | A1* | 3/2012 | Rao | B60N 2/28 340/425.5 |
| 2016/0221583 | A1* | 8/2016 | Valeri | G10L 17/00 |
| 2018/0005512 | A1* | 1/2018 | Ran | B60H 1/00757 |
| 2018/0358031 | A1* | 12/2018 | Scheler | H04R 3/02 |
| 2020/0098383 | A1* | 3/2020 | Berger | G10L 21/0232 |
| 2021/0275056 | A1* | 9/2021 | Mcmahon | A61B 5/11 |

FOREIGN PATENT DOCUMENTS

| | | | | |
|---|---|---|---|---|
| JP | 2007259292 | A * | 10/2007 | |
| WO | WO-03019531 | A1 * | 3/2003 | G10L 19/02 |
| WO | WO-2019122414 | A1 * | 6/2019 | A61B 5/0205 |
| WO | 202075035 | A1 | 4/2020 | |
| WO | WO-2020075035 | A1 * | 4/2020 | G08B 21/24 |

OTHER PUBLICATIONS

Office Action received for German Patent Application No. 11 2021 004 213.0, mailed on Jan. 13, 2026, 17 pages (9 pages of English Translation and 8 pages of Original Document).

* cited by examiner

IN-CABIN PRESENCE DETECTION

PRIORITY DATA

This application is a national stage of International Application No. PCT/EP2021/072105, filed Aug. 6, 2021, which claims priority to U.S. provisional patent application No. 63/062,637, filed Aug. 7, 2020, the contents of which applications are hereby incorporated herein by reference in their entireties.

FIELD OF THE DISCLOSURE

This disclosure relates in general to the field of vehicle lifeform presence detection, and more particularly, though not exclusively, to a system, method, and computer-readable media for detecting presence of lifeforms (such as children) within a cabin of a vehicle.

BACKGROUND

It is hazardous to leave children or pets within a vehicle, particular in warm or very cold weather conditions. Heat stroke in warm or hot weather is a particular danger to children and pets. People may leave children or pets (referred to, generally, as lifeforms) inside a vehicle accidentally, leave the vehicle longer than they intended to, or misjudge the weather conditions and heat build-up inside the vehicle, any of which can put the lifeforms in vehicles at risk of injury or death. Detecting the presence of lifeforms left in a parked, unattended vehicle, and alerting the vehicle owner or other bystanders to the lifeforms, can reduce the risk.

Existing methods for detecting lifeforms include in-vehicle cameras or radar-based approaches. However, such methods have blind spots, e.g., a child or pet that has crawled into the front seat footwell or a back storage area of the vehicle may not be detected by such systems. In addition, methods for detecting infants or children left in child safety seats, such as weight or motion sensors, have been developed. While these systems provide targeted coverage for the child safety seats, they do not detect children that are not in a seat or pets.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

DETAILED DESCRIPTION

Figure 1:
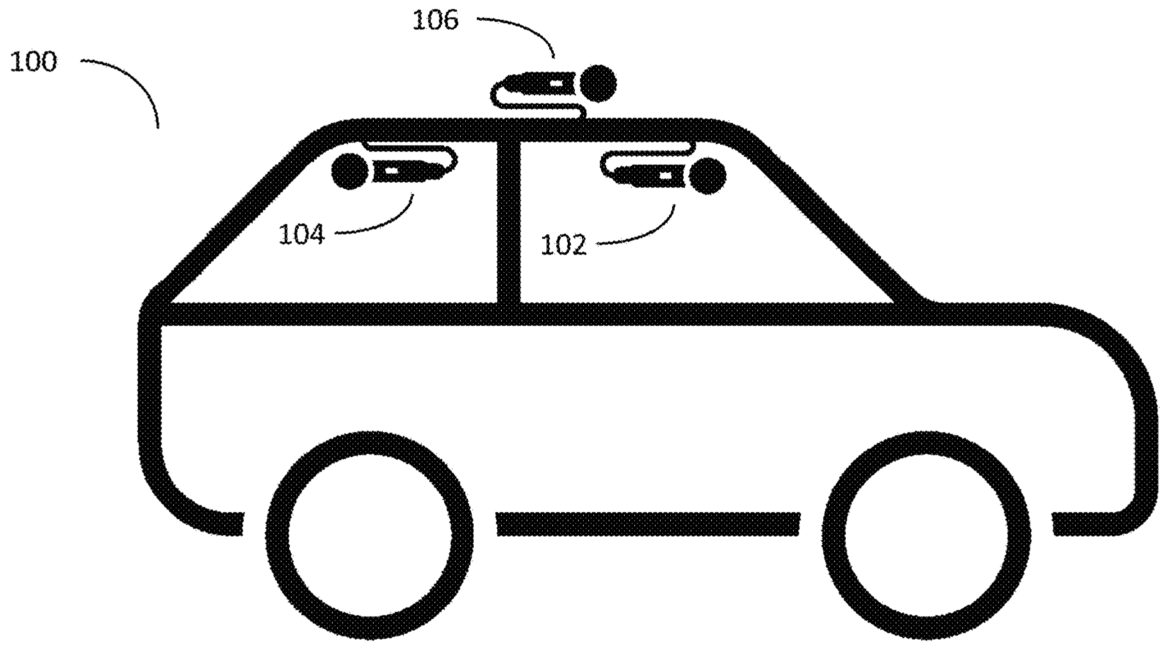
FIG. 1 illustrates an example vehicle with sound capture system, according to various embodiments of the disclosure.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples, or in some cases across different figures. This repetition is for the purpose of simplicity and clarity and does not in itself dictate a specific relationship between the various embodiments and/or configurations discussed. Different embodiments may have different advantages, and no particular advantage is necessarily required of any embodiment.

The embodiments disclosed herein provide sound-based approaches for determining whether a lifeform is left in a parked, unattended vehicle. For example, a detection system includes one or more microphones to capture sounds inside a cabin of the vehicle and/or outside of the vehicle cabin. The detection system performs analysis of the captured sounds to determine the source of the sounds. For example, the analysis may determine whether a sound is associated with a lifeform, and/or whether the source of the sound is located within the cabin of the vehicle or outside of the vehicle. A lifeform left unattended within a vehicle will produce sound at some point, and determining whether the sound is associated with a lifeform and/or whether the sound is located within the cabin or outside of the vehicle can help to identify the lifeform left within a vehicle and take actions to address the situation before harm (such as heatstroke) may come to the lifeform.

The detection system may perform multiple types of analysis on the captured sound, such as triangulation, spectral response, reverberation, and/or volume level analysis. Using multiple analysis approaches can increase confidence in a determination of whether a lifeform is present. In some embodiments, one or more of the analysis approaches may be utilized to determine whether a lifeform is located within the cabin of the vehicle, and the other approaches may be utilized if the one or more approaches are inconclusive in the determination of whether a lifeform is within the vehicle. In other embodiments, a plurality of the approaches may be utilized for determining whether there is a lifeform within the vehicle.

The approaches may further be configured for detection of a particular lifeform, such as a child and/or animal. For example, the approaches may be configured to detect certain sounds, certain duration of sounds, and/or certain frequencies of sounds associated with a particular lifeform. In some examples, the detection system may be configured to detect sounds having frequencies associated with children, such as sounds within a frequency range associated with a child's cry.

Example Vehicle with Sound Capture System

FIG. 1 illustrates an example vehicle 100 with a sound capture system, according to various embodiments of the disclosure. The vehicle 100 may be a passenger vehicle, such as a car, truck, van, or sport utility vehicle (SUV). The vehicle 100 may have one or more microphones implemented within and/or mounted to the vehicle 100. The microphones may be located and/or directed within a cabin of the vehicle or outside of the vehicle 100. In the illustrated embodiment, the vehicle has a first interior microphone 102 located within a front portion of the cabin of the vehicle 100 and a second interior microphone 104 located within a back portion of the cabin of the vehicle 100. The vehicle further has an exterior microphone 106 located outside of the vehicle 100. It should be understood that the three microphones illustrated are merely shown to illustrate some possible locations for microphones of the sound capture system, and the sound capture systems as described throughout this disclosure may have more or less microphones located within the cabin of the vehicle 100 and/or outside of the vehicle 100. It should also be understood that microphones located outside of the vehicle 100 may be omitted in some embodiments, and microphones located within the cabin of the vehicle 100 may be omitted in other embodiments. Further, the illustration utilized for showing the microphones illustrates a particular type of microphones that extend from the body of the vehicle 100. It should be understood that the microphones may be any type of microphone and/or may be implemented within a body of the vehicle 100 rather than extending from the body of the vehicle 100.

The first interior microphone 102 and the second interior microphone 104 may capture sound inside the cabin of the vehicle 100, while the exterior microphone 106 may capture sound outside of the vehicle 100. While the body of the vehicle 100 may cause attenuation of sounds passing through the body of the vehicle 100, it is possible that sounds originating outside of the vehicle 100 may be captured by the interior microphones 102 and 104 and sounds originating within the cabin of the vehicle 100 may be captured by the exterior microphone 106. Accordingly, while the first interior microphone 102 and the second interior microphone 104 may capture sound inside the cabin of the vehicle 100, the sound captured may have originated from inside or outside of the vehicle 100. Further, while the exterior microphone 106 may capture sound outside of the vehicle 100, the sound captured may have originated from inside or outside of the vehicle 100.

Figure 2:
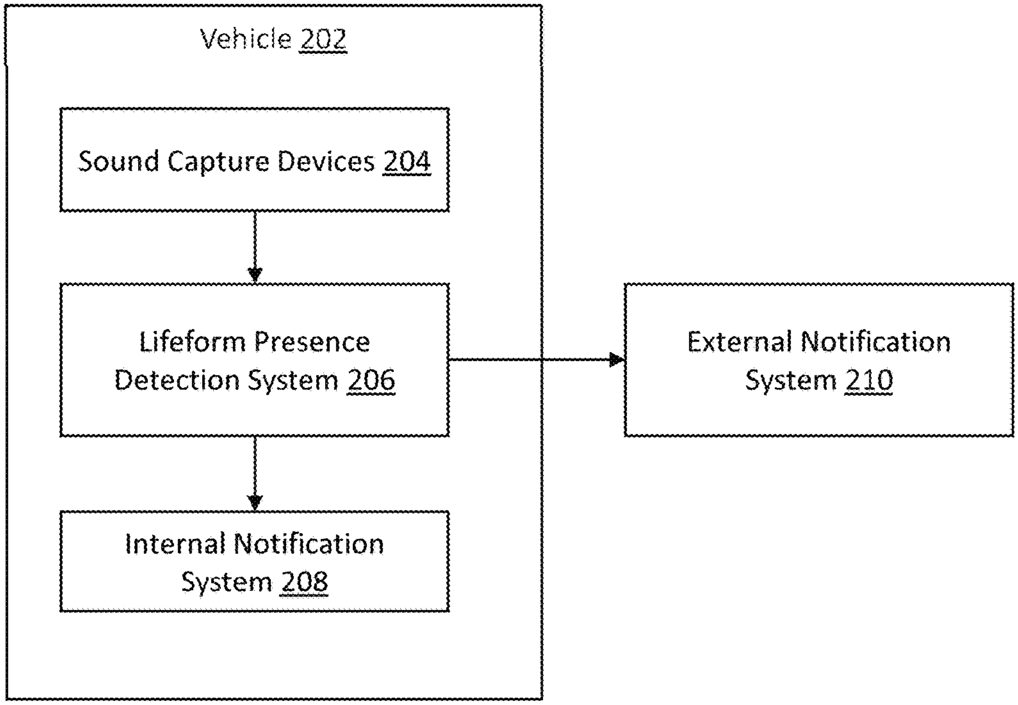
FIG. 2 illustrates an example lifeform presence detection system, according to various embodiments of the disclosure.

The sound captured by the microphones may be transmitted to a lifeform presence detection determination system, as described further throughout this disclosure. For example, the sounds captured by the first interior microphone 102, the second interior microphone 104, and the exterior microphone 106 may be transmitted to a lifeform presence detection determination system, such as the lifeform presence detection determination system 206 (FIG. 2). The captured sounds may be transformed to electrical signal representations of the sounds for transmission to the lifeform presence determination system and analysis of the sounds.

Example Lifeform Presence Detection System

FIG. 2 illustrates an example lifeform presence detection system 200, according to various embodiments of the disclosure. The lifeform presence detection system 200 may be implemented as part of a vehicle 202. The vehicle 202 may include one or more of the features of the vehicle 100 (FIG. 1).

The lifeform presence detection system 200 includes one or more sound capture devices 204, e.g., microphones. The sound capture devices 204 capture sound and convert it to an electrical signal, referred to as a sound signal. The sound capture devices 204 may include one or more of the features of the first interior microphone 102 (FIG. 1), the second interior microphone 104 (FIG. 1), and/or the exterior microphone 106 (FIG. 1). For example, the sound capture devices 204 may be located within a cabin of the vehicle 202, on an outside of the vehicle 202, or some combination thereof. Accordingly, the sound capture devices 204 may capture sounds within the cabin of the vehicle 202, outside of the vehicle 202, or some combination thereof.

The lifeform presence detection system 200 further includes a lifeform presence detection determination system 206. The lifeform presence detection determination system 206 may be implemented as one or more processors, one or more integrated circuits, one or more circuits, or some combination thereof. The lifeform presence detection determination system 206 is coupled to the sound capture devices 204 and receives sound signals from the sound capture devices 204. The lifeform presence detection determination system 206 analyzes the sound signals received from the sound capture devices 204, as described further throughout this disclosure, and determines whether there is presence of a lifeform (such as a child, a pet, or another lifeform) within the cabin of the vehicle 202 based on the sound signals.

The lifeform presence detection determination system 206 may analyze the sound signals to determine whether a lifeform is within the cabin of the vehicle 202 in response to certain conditions of the vehicle 202. For example, the lifeform presence detection determination system 206 may begin analyzing the sound signals in response to the doors of the vehicle 202 being closed and the vehicle 202 being turned off for a certain period of time. In other embodiments, the lifeform presence detection determination system 206 may begin analyzing the sound signals in response to other states of the vehicle 202. The lifeform presence detection determination system 206 may receive signals indicating the status of the doors, whether the vehicle 202 is turned off, etc. from another component of the vehicle 202. The lifeform presence detection determination system 206 may continue analyzing the sound signals until a certain state of the vehicle 202, such as a door of the vehicle 202 opening or the vehicle 202 being started. The lifeform presence detection determination system 206 may discontinue analyzing sounds after a predetermined length of time after which it may be assumed there are no lifeforms in the vehicle 202.

The lifeform presence detection system 200 may further include an internal notification system 208 that is internal to the vehicle 202. For example, the internal notification system 208 may comprise one or more elements of the vehicle 202 (such as an alarm system of the vehicle 202, a horn of the vehicle 202, lights of the vehicle 202, window actuators of the vehicle 202, lock actuators of the vehicle 202, door actuators of the vehicle 202, or some combination thereof). The internal notification system 208 may be coupled to the lifeform presence detection determination system 206 and may perform one or more operations based on the determination of presence of a lifeform within the cabin of the vehicle 202 made by the lifeform presence detection determination system 206. For example, the internal notification system 208 may cause the alarm of the vehicle 202 to sound, the horn of the vehicle 202 to sound, the lights of the vehicle 202 to flash, the windows of vehicle 202 to open, the doors of the vehicle 202 to be unlocked, and/or the doors of the vehicle 202 to open in response to lifeform presence detection determination system 206 determining that there is a lifeform within the cabin of the vehicle 202. In some embodiments, the operations performed by the internal notification system 208 in response to the lifeform presence detection determination system 206 determining that a lifeform is located within the cabin of the vehicle 202 may be dependent on a type of lifeform that is determined to be within the vehicle. For example, in response to the lifeform presence detection determination system 206 determining that a pet is within the cabin of the vehicle 202, the internal notification system 208 may cause the windows of the vehicle 202 to open to prevent the pet from overheating. In response to the lifeform presence detection determination system 206 determining that a child is within the cabin of the vehicle 202, the internal notification system 208 may cause the alarm of the vehicle 202 to sound, the horn of the vehicle 202 to sound, the lights of the vehicle 202 to flash, the windows of the vehicle 202 to open, the doors of the vehicle 202 to unlock and/or or open, or some combination thereof.

The lifeform presence detection system 200 may further include an external notification system 210. The external notification system 210 may be located, at least in part, external to vehicle 202 and may be coupled to the lifeform presence detection determination system 206 of the vehicle 202. The external notification system 210 may be comprise a communication network (such as a cellular network), an emergency notification system (such as a system to provide notification to fire departments, police, other social services, and/or private services), an electronic key associated with the vehicle 202, a device associated with an owner or user of the vehicle 202 or software running on such a device, or some combination thereof. The external notification system 210 may provide notification via the communication network or the emergency notification. For example, the external notification system 210 may provide a message to a cellphone of the vehicle owner, e.g., as a text message, an automated phone call, or a message through an app. As another example, the external notification system 210 may transmit an alert via a short-range wireless communication protocol to keys for the vehicle 202 and/or another device for displaying alerts or messages to a person or people associated with the vehicle (such as the owner of the vehicle 202, normal drivers of the vehicle 202, or some combination thereof) in response to the lifeform presence detection determination system 206 determining that there is a lifeform within the cabin of the vehicle 202. A user of the lifeform presence detection system 200 may be able to define to whom which the message is provided by the external notification system 210. As another example, the external notification system 210 may provide an alert including an indication of a location of the vehicle 202 to one or more emergency notification systems such that an emergency crew can respond to the lifeform being determined to be within the vehicle 202 by the lifeform presence detection determination system 206. In some embodiments, the lifeform presence detection determination system 206 may cause the internal notification system 208 and the external notification system 210 to provide alerts at different times, or different aspects of either notification system 208 or 210 to provide alerts at different times. For example, the lifeform presence detection determination system 206 may cause the external notification system 210 to provide a notification to an emergency service a certain time after the external notification system 210 and/or internal notification system 208 provides a notification; this allows the person or people associated with the vehicle 202 to respond to the notification prior to emergency services being notified.

In some embodiments, the lifeform presence detection determination system 206 may be coupled to a computer system of the vehicle 202 and may receive data from the computer system of the vehicle 202. The lifeform presence detection determination system 206 may utilize the data from the computer system to determine when the lifeform presence detection determination system 206 is to be analyzing the sounds, when the operations to be performed by the internal notification system 208 and/or the external notification system 210 are to be triggered, which operations are to be performed by the internal notification system 208 and/or the external notification system 210, or some combination thereof. For example, the lifeform presence detection determination system 206 may utilize temperature within the cabin of the vehicle and/or temperature external to the vehicle 202 that may be received from computer system of the vehicle 202 to determine when to trigger the internal notification system 208 and/or the external notification system 210.

It should be understood that the lifeform presence detection system 200 illustrated is an embodiment of a lifeform presence detection system. In other embodiments, additional components may be included in the lifeform presence detection system 200 and/or components may be omitted. For example, the internal notification system 208 and/or the external notification system 210 may be omitted in other embodiments.

Example Lifeform Presence Detection Process

Figure 3:
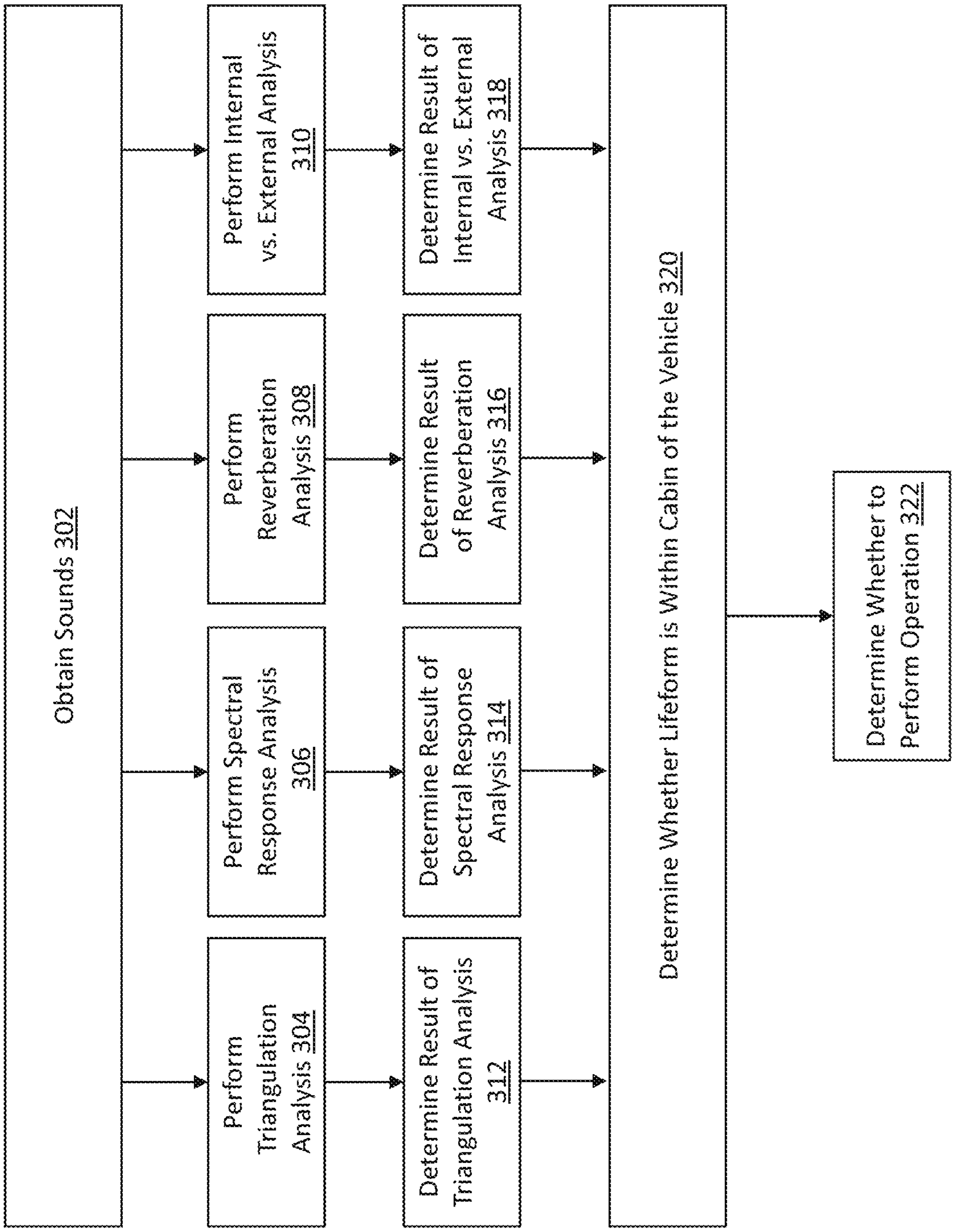
FIG. 3 illustrates an example process for lifeform presence detection, according to various embodiments of the disclosure.

FIG. 3 illustrates an example process 300 for lifeform presence detection, according to various embodiments of the disclosure. The process 300 may be performed by the lifeform presence detection determination system 206 (FIG. 2). In some embodiments, the process 300 may correspond to computer software, where the computer software may cause the process 300 to be performed by a device that executes the computer software. For example, the computer software may comprise a plurality of instructions that can be stored on one or more computer-readable media, where the instructions, when executed by a device, may cause the device to perform the process 300.

The process 300 includes obtaining 302 sounds from one or more microphones, such as the first interior microphone 102 (FIG. 1), the second interior microphone 104 (FIG. 1), the exterior microphone 106 (FIG. 1), and/or the sound capture devices 204 (FIG. 2). The sounds may be provided as electronic signals from the microphones.

The process 300 further includes performing one or more analyses (which may be referred to as lifeform determination analyses) on the sounds obtained in 302. In particular, the lifeform presence detection determination system 206 (FIG. 2) may perform the analyses one the sounds obtained in 302. In the illustrated embodiment, the analyses include performing triangulation analysis in 304, performing spectral response analysis in 306, performing reverberation analysis in 308, and performing internal versus external analysis in 310. In should be understood that in other embodiments more or less analyses may be performed on the sound obtained. For example, in one embodiment, spectral response analysis 306 and internal vs. external analysis 310 are performed, and triangulation analysis 302 and reverberation analysis 308 are not used. In some examples, a single analysis, e.g., spectral response analysis 306, is used.

In some examples, different vehicles may use different analysis methods or combinations of analysis methods. For example, different vehicle materials produce different effects on sound inside the vehicle cabin, e.g., cloth seats absorb more high-frequency sounds than leather seats, which are more reflective. As an example, reverberation analysis 308 may be more relevant in an environment with more reflectivity, so reverberation analysis 308 may be used for vehicles with leather interiors, but not cloth interiors. As another example, an analysis method may be selected or omitted based on the number and position of the microphones and the resulting confidence in an analysis given the microphone availability. For example, if a vehicle 100 has one interior microphone 102, spectral response analysis 306 may not be performed, and if the vehicle 100 has two interior microphones 102 and 104, spectral response analysis 306 is performed. As another example, if a vehicle 100 has no exterior microphone 106, internal vs. external analysis 310 may not be performed. As still another example, if the microphones are positioned closely together (e.g., the external microphone is located above one of the internal microphones), or fewer than three microphones are included, the triangulation analysis 302 may provide less accurate or less useful results, and may not be performed.

More generally, one or more analysis methods may be selected based on whether they are able to provide meaningful information on whether a sound corresponds to a lifeform within the vehicle cabin. The analysis method(s) may be selected based on various factors, including the shape, size, and materials of the vehicle cabin, and the number and placement of the sound capture devices 204 in or around the vehicle cabin. In some embodiments, the results of the selected analysis methods are weighted, e.g., to favor analysis methods that produce more accurate results. For example, if one analysis method determines whether a noise is emitted by a lifeform inside the vehicle with 95% confidence, and another method determines whether a noise is emitted by a lifeform inside the vehicle with a lower confidence (e.g., 70% confidence), a weighted, combined score based on both of the analysis results may determine whether the noise is emitted by a lifeform inside the vehicle with a higher confidence than either method independently, e.g., 98% or greater confidence.

The selected analysis methods may be performed concurrently, sequentially, or some combination thereof. In some embodiments, results of one or more of the analyses may trigger one or more of the other analyses to be performed. For example, one or more of the analyses may be initiated in response to obtaining the sounds, while one or more of the other analyses may be initiated in response to the one or more analyses initiated in response to obtaining the sounds proving inconclusive. Utilizing multiple analyses to determine whether there is a lifeform within the cabin of the vehicle may provide improved detection as compared to using a single analysis.

In 304, triangulation analysis may be performed with the obtained sound signals. Triangulation analysis may be utilized when a lifeform presence detection system (such as the lifeform presence detection system 200 (FIG. 2)) includes multiple microphones, such as three or more sound capture devices 204. The lifeform presence detection system 200 performing the process 300 may receive the sounds from multiple microphones and identify certain sound components within the sound signals received. The sound components identified may be associated with one or more lifeforms. For example, the obtained sound signals may be filtered based on frequency or other signal qualities to identify sound components associated with children and/or pets. A matching sound component, e.g., a particular wave portion having a start point and an end point, may be identified in each of the obtained and filtered sound signals. Based on the filtered sound components and the relative position of the microphones, the lifeform presence detection determination system may determine a result of the triangulation analysis in 312, which may include to determine a location, or locations, of the source, or sources, of the sounds. The location may include a distance from one or more sound capture devices 204 and/or another distance from another point (e.g., a midpoint between the sound capture devices 204) and/or a direction relative to one or more of the sound capture devices 204 and/or a direction relative to another point.

In 306, spectral response analysis may be performed with the obtained sound signals. The spectral response analysis may be utilized when a lifeform presence detection system (such as the lifeform presence detection system 200) includes one or more microphones located within the cabin of the vehicle and/or one or more microphones located outside of the vehicle. The spectral response analysis may utilize levels of the sounds, frequencies of the sounds, attenuation of the sounds, times at which the sounds occurred, and/or other characteristics of the sound signals to determine whether the sound signals indicate that a lifeform is within the cabin of the vehicle. The spectral response analysis may be based on the sound characteristics of the vehicle, e.g., which sound spectrum or spectra pass through the vehicle from the inside to the outside or vice versa. In particular, the body of a vehicle may attenuate certain sound frequencies passing through the vehicle, e.g., the vehicle body may attenuate higher frequencies (e.g., frequencies above 4 kHz or 5 kHz) and pass lower frequencies (e.g., frequencies below 4 kHz or 5 kHz), thus behaving as a low-pass filter. Thus, a high-frequency sound (and particularly, a sustained high-frequency sound) captured by a microphone in the vehicle interior indicates that the sound source is inside the vehicle; conversely, a high-frequency sound captured by a microphone on the vehicle's exterior indicates that the sound source is outside the vehicle.

Figure 4:
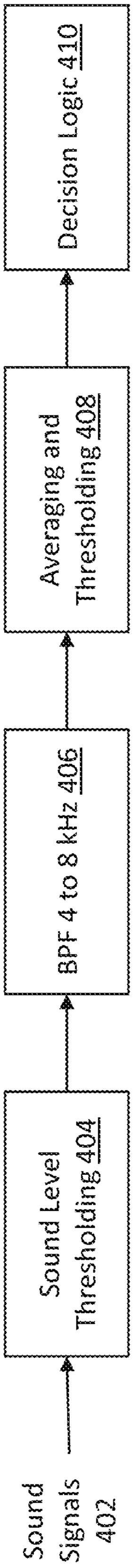
FIG. 4 illustrates an example process for spectral response analysis, according to various embodiments of the disclosure.
Figure 6:
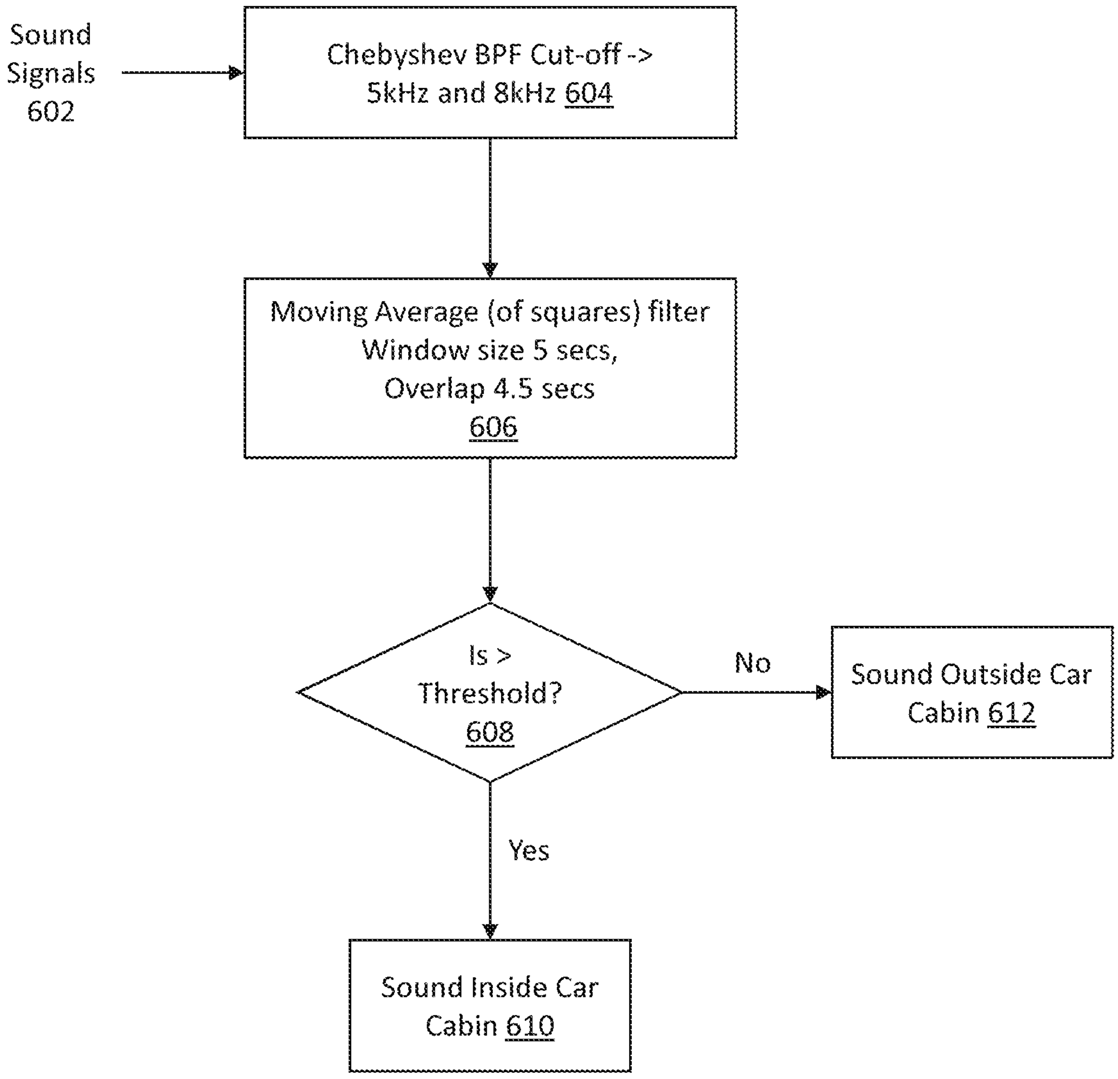
FIG. 6 illustrates another example process for spectral response analysis, according to various embodiments of the disclosure.

FIG. 4 and FIG. 6 illustrate two example processes for spectral response analysis. Based on the spectral response analysis, the lifeform presence detection determination system 206 may determine a result of the spectral response analysis, which may include a determination whether the origination of the sounds were within the cabin of the vehicle, outside of the vehicle, generated by a lifeform, or some combination thereof, in 314. In some embodiments, the obtained sound signals may be filtered to sounds associated with one or more lifeforms and the spectral response analysis may be performed on the filtered sounds.

The spectral response analysis may be performed individually on the sound signals from each sound capture device 204 and the spectral analysis results considered individually or in combination. The lifeform presence detection determination system 206 may include various rules for combining spectral analysis results from multiple interior and/or exterior sound capture devices. In some conditions, e.g., if a window has been left open, the attenuation may be less than other conditions, e.g., if the vehicle's doors and windows are closed. Including multiple interior microphones, as shown in FIG. 1, may provide more accurate results across different conditions. For example, if a front window is open, a first interior microphone 102 situated near the front of the vehicle may not produce high confidence spectral response results, but a second interior microphone 104 situated near the back of the vehicle and away from the open window is better able to distinguish interior vs. exterior sounds based on spectral response. Thus, including multiple interior microphones may reduce the risk of a false-positive, e.g., if a high-frequency sound is detected in an exterior microphone and a first interior microphone, but not a second interior microphone, this may indicate that a window near the first interior microphone is opened, and the sound source is outside the vehicle. Including multiple interior microphones can also improve detection, e.g., if a high-frequency sound is detected at a first interior microphone, but not a second interior microphone or an exterior microphone, this may indicate that the sound source is inside the vehicle and nearer to the first interior microphone.

In 308, reverberation analysis may be performed with the obtained sound signals. The reverberation analysis may be utilized when a lifeform presence detection system (such as the lifeform presence detection system 200) includes one or more microphones located within the cabin of the vehicle. The reverberation analysis may analyze reverberation of the sound within the cabin of the vehicle to determine whether the sounds originated within the vehicle. In 316, the lifeform presence detection determination system may determine a result of the reverberation analysis, which may include determining whether a source or sources of the sounds is within the cabin of the vehicle, whether the source of the sounds are associated with a lifeform, or some combination thereof. As noted above, different car interiors may have different reverberation properties. The reverberation signature of a sound signal may indicate whether a sound originated inside the vehicle cabin or outside the vehicle cabin. The reverberation analysis may be specific to the vehicle make and model, or to one or more interior properties (e.g., interior material(s), size (e.g., cubic feet), or other factors).

In 310, internal versus external analysis may be performed with the obtained sound signals. The internal versus external analysis may be utilized when a lifeform presence detection system (such as the lifeform presence detection system 200) includes one or more microphones located within the cabin of the vehicle and one or more microphones located outside of the vehicle. The internal versus external analysis may include determining which sounds are captured by the microphones located within the cabin of the vehicle and which sounds are captured by the microphones located outside of the vehicle. The lifeform presence detection determination system may identify sound signals captured by the microphones located within the cabin of the vehicle associated with one or more lifeforms. The lifeform presence detection determination system may identify corresponding sound signals captured by the microphones outside of the vehicle and compare the corresponding sound signals with the sound signals captured by the microphones located within the cabin of the vehicle, e.g., comparing the amplitudes or volumes of the sound signals, or comparing other properties. Based on the comparison, the lifeform presence detection determination system may determine a result of the internal vs. external analysis, which may include determining whether a source or sources of the sounds is within the cabin of the vehicle, in 318.

In 320, it is determined whether a lifeform is located within the cabin of the vehicle. In particular, the lifeform presence detection determination system may determine whether a lifeform is located within the cabin of the vehicle. In some embodiments, a type of the lifeform (e.g., human, cat, dog, etc.) within the cabin of the vehicle is determined. The lifeform presence detection determination system determines whether a lifeform is within the cabin of the vehicle based on the results of the analyses produced in 312, 314, 316, and/or 318. In some embodiments, the lifeform presence detection determination system determines that a lifeform is in the vehicle in response to the result of any of the performed analyses indicating that a lifeform is within a cabin of a vehicle, e.g., in response to any of 312, 314, 316, or 318 providing a Yes result. In other embodiments, the lifeform presence detection determination system may determine that a lifeform is in the vehicle based on a certain percentage or number of the results of the analyses indicating that it has been determined that a lifeform is within the cabin of the vehicle (e.g., 2 out of 3 performed analyses, 2 out of 4 performed analyses, or 3 out of 4 performed analyses). In some embodiments, the analyses may be prioritized, such that a portion of the analyses may be considered first for determination of whether a lifeform is within a cabin of the vehicle, and other portions of the analyses are considered if the portion considered first are inconclusive. In other embodiments, a portion of the analyses may be performed initially upon obtaining the sounds and other portions of the analyses can be performed if it is determined in 320 that the results of the analyses are inconclusive.

In some embodiments, the results of the analyses are weighted and summed, and the summed result is compared to a threshold. For example, the triangulation analysis may have a weighting of 0.2, the spectral response a weighting of 0.3, the reverberation analysis a weighting of 0.1, and the internal vs. external analysis a weighting of 0.4. The result (0 for Yes or 1 for No) for each analysis is multiplied by the weight for that analysis, and the weighted results are summed. For example, if the reverberation analysis resulted in a No determination, and the other three analyses resulted in a Yes determination, the weighted sum is 0.2*1+0.3*1+0.1*0+0.4*1=0.9. This may be compared to a threshold, e.g., 0.7, and if the weighted sum is greater than the threshold, the process 320 determines that a lifeform is within the cabin of the vehicle.

In some embodiments, rather than each analysis providing a binary outcome (e.g., yes or no), one or more analyses may provide a non-binary outcome, such as a percentage likelihood that the sound signals indicate that a lifeform is in the vehicle. In such embodiments, each of the percentage outcomes may be multiplied by a weighting factor, summed, and the sum compared to a threshold, as described above.

In 322, it may be determined if operations and/or which operations are to be performed based on whether lifeforms are determined to be located within the cabin of the vehicle. For example, the lifeform presence detection determination system may determine that operations should be performed based on a determination in 320 that a lifeform is located within the cabin of the vehicle. Further, the lifeform presence detection determination system may determine the operations to be performed based on whether a lifeform is determined to be within the cabin of the vehicle, a type of lifeform determined to be within the cabin of the vehicle, data received from a computer system of the vehicle, or some combination thereof. The operations may include any of the operations that can be performed by an internal notification system (such as the internal notification system 208 (FIG. 2)) and/or an external notification system (such as the external notification system 210 (FIG. 2)). In response to determining that one or more operations, the lifeform presence detection determination system may trigger the internal notification system and/or the external notification system to perform the operations determined to be performed.

Example Processes for Spectral Response Analysis

FIG. 4 illustrates an example process 400 for spectral response analysis, according to various embodiments of the disclosure. The spectral response analysis process 400 may be performed by a lifeform presence detection determination system (such as the lifeform presence detection determination system 206 (FIG. 2)). The spectral response analysis process 400 may be performed as the spectral analysis in 306 (FIG. 3) in the process 300 (FIG. 3).

The process 400 begins by obtaining sound signals 402 from one or more sound sources. The lifeform presence detection determination system may receive the sound signals 402 from one or more microphones, such as the first interior microphone 102 (FIG. 1), the second interior microphone 104 (FIG. 1), the exterior microphone 106 (FIG. 1), and/or the sound capture devices 204 (FIG. 2). The sounds may be obtained as electrical signals representing sounds detected by the one or more microphones. In some embodiments, the sound signals utilized by the spectral response analysis process 400 may be limited to sounds captured by microphones within the vehicle cabin, e.g., interior microphones 102 and 104.

In 404, the lifeform presence detection determination system applies sound level thresholding to the sound signals 402. In particular, portions of the sound signals that are below a certain amplitude may be removed from the sound signals for further processing. Accordingly, portions of the sound signals below the certain amplitude may be filtered from a signal being processed by the lifeform presence detection determination system.

In 406, the lifeform presence detection determination system applies bandpass filtering to the sound signals remaining after the sound thresholding. The bandpass filtering may cause the sound signals to be filtered to frequencies of sounds associated with a lifeform. For example, the frequencies of sounds for which the bandpass filtering is applied may correspond with crying of a child in some embodiments. The bandpass filtering may be further based on the acoustic characteristics of the car cabin, including the acoustic characteristics of sound passing from outside to inside. In the illustrated embodiment, the bandpass filtering illustrated may have a pass frequency range from four kilohertz (kHz) to eight kHz. Accordingly, sounds with frequencies outside of the range may be filtered from the sound signals, leaving sound related to the lifeform or lifeforms. It should be understood that the frequency range of the bandpass filtering may differ and/or the lifeform with which the frequency range corresponds may differ in other embodiments. In some embodiments, the frequency range differs based on the range of frequencies attenuated by the car body. In some embodiments, the sounds remaining after the sound level thresholding may be applied to multiple bandpass filters where each of the bandpass filters have a bandpass range corresponding to different lifeforms for which detection within a cabin of a vehicle are desired. Each of the bandpass filters may output filtered sound signals corresponding to the frequency ranges for each of the bandpass filters, where the filtered sound signal output may be processed as the filtered sound signal described further in the process 400.

In 408, the lifeform presence detection determination system applies averaging and thresholding to the filtered sound signals produced by the bandpass filtering in 406. In particular, the sound signals may be separated into multiple windows of set time periods, where each of the windows may overlap with adjacent windows. For example, the sound signals may be separated into 5 second windows where each of the windows overlap with the adjacent windows by 4.5 seconds in some embodiments. The lifeform presence detection determination system may calculate an average of the sum of the squares of the amplitude of each of the windows. The lifeform presence detection determination system may further apply thresholding to the averages of each of the windows. For example, each of the averages is compared to a threshold value to determine which of the windows exceed the threshold value. In some embodiments, the averages are compared to two or more threshold values. For example, the averages may be compared to a first threshold value and a second threshold value in some embodiments. In some of these embodiments, the first threshold value may be lower than the second threshold value, where averages that are lower than the first threshold value are interpreted as indicating that there is no lifeform within the cabin of the vehicle, averages that are between the first threshold value and the second threshold value are interpreted as being inconclusive, and averages that are higher than the second threshold value are interpreted as indicating that there is a lifeform within the cabin of the vehicle. In instances when the averages are interpreted as being inconclusive, one or more other analyses may be utilized for determining whether there is a lifeform within the cabin of the vehicle. In some examples, the threshold value(s) are selected based on an attenuation of a body of the vehicle, such that the averages that exceed the threshold value correspond to sounds that are likely to have originated within the cabin of the vehicle and averages that are below the threshold value corresponds to sounds that are likely to have originated outside of the cabin of the vehicle.

Figure 5:
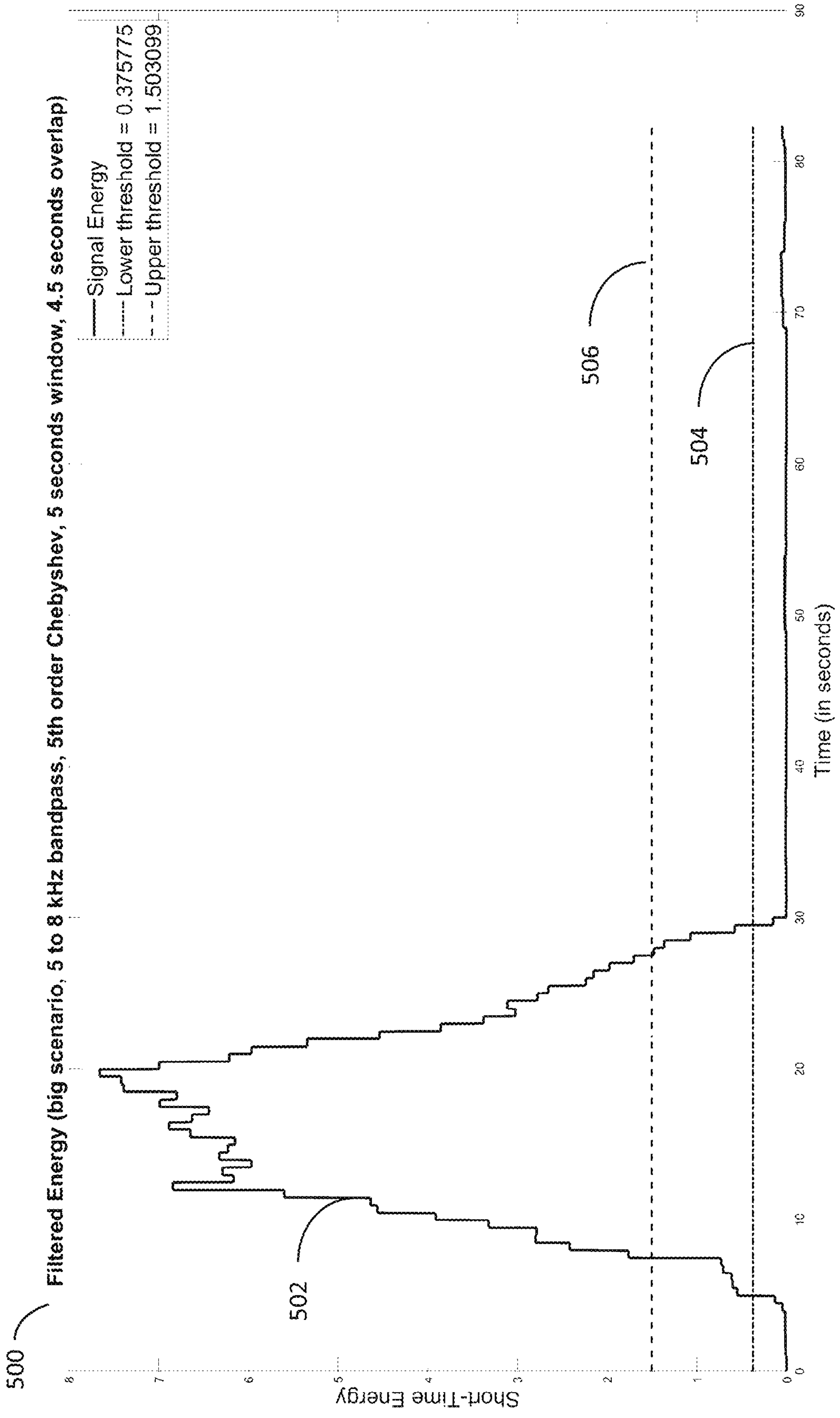
FIG. 5 illustrates an example graph showing averaging and thresholding in a spectral response analysis, according to various embodiments of the disclosure.

FIG. 5 illustrates an example graph 500 showing averaging and thresholding of 408 (FIG. 4), according to various embodiments of the disclosure. In particular, the graph 500 shows a resultant line 502 showing the averaged amplitude of filtered sounds resulting from the averaging performed at 408. The graph 500 further shows a first threshold value 504 and a second threshold value 506 to which the averaged amplitude is compared. For example, when the resultant line 502 is lower than the first threshold value 504, the averaging and thresholding of 408 may indicate that there is no lifeform within the cabin of the vehicle. When the resultant line 502 is between the first threshold value 504 and the second threshold value 506, the averaging and thresholding of 408 may indicate that the results are inconclusive as to whether there is a lifeform within the cabin of the vehicle. When the resultant line 502 is above the second threshold value 506, the averaging and thresholding of 408 may indicate that there is a lifeform within the cabin of the vehicle.

In 410, the lifeform presence detection determination system determines whether the result of the averaging and thresholding 408 indicates that a lifeform is within the cabin. In particular, the results of the averaging and thresholding 408 are analyzed to determine whether the results indicate a lifeform is located within the cabin of the vehicle. For example, if the averages of 408 remain below a first threshold value, this indicates that a lifeform is not within the cabin of the vehicle; if the averages of 408 peak between the first threshold value and a second threshold value, this indicates that it is inconclusive whether there is a lifeform within the cabin of the vehicle; and if the averages of 408 peak greater than the second threshold value, this indicates that a lifeform is within the cabin of the vehicle.

The elements of the spectral response analysis process 400 may each comprise a software component and/or circuitry of a lifeform presence detection determination system (such as the lifeform presence detection determination system 206 (FIG. 2)). For example, each of 404, 406, 408, and 410 may comprise a software module and/or circuitry of the lifeform presence detection determination system. In other embodiments, the elements of the spectral response analysis process 400 may be operations that may be caused to be performed by a device when instructions (such as software) stored on computer-readable media is executed by the device.

FIG. 6 illustrates another example spectral response analysis process 600, according to various embodiments of the disclosure. The spectral response analysis process 600 may be performed by a lifeform presence detection determination system (such as the lifeform presence detection determination system 206 (FIG. 2)). The spectral response analysis process 600 may be performed as the spectral analysis in 306 (FIG. 3) in the lifeform presence detection process 300 (FIG. 3).

The process 600 begins by obtaining sound signals 602 from one or more sound sources. The lifeform presence detection determination system may receive the sound signals 602 from one or more microphones, such as the first interior microphone 102 (FIG. 1), the second interior microphone 104 (FIG. 1), the exterior microphone 106 (FIG. 1), and/or the sound capture devices 204 (FIG. 2). The sounds may be obtained as electrical signals representing sounds detected by the one or more microphones. In some embodiments, the sound signals utilized by the spectral response analysis process 600 may be limited to sounds captured by microphones within the vehicle cabin, e.g., interior microphones 102 and 104.

In 604, the lifeform presence detection determination system applies bandpass filtering to the sound signals 602. The bandpass filtering may cause the sounds to be filtered to frequencies of sounds associated with a lifeform. For example, the frequencies of sounds for which the bandpass filtering is applied may correspond with crying of a child in some embodiments. In the illustrated embodiment, the bandpass filtering illustrated may be a Chebyshev bandpass filter and may have a pass frequency range from five kHz to eight kHz. Accordingly, sounds with frequencies outside of the range may be filtered from the sounds leaving sound related to the lifeform. It should be understood that the frequency range of the bandpass filtering may differ and/or the lifeform with which the frequency range corresponds may differ in other embodiments. In some embodiments, the sounds may be applied to multiple bandpass filters where each of the bandpass filters have a bandpass range corresponding to different lifeforms for which detection within a cabin of a vehicle are desired. Each of the bandpass filters may output filtered sound signals corresponding to the frequency ranges for each of the bandpass filters, where the filtered sound signals output may be processed as the filtered sound is described further in the process 600.

In 606, the lifeform presence detection determination system applies a moving average filter to the sound signals resulting from the bandpass filtering of 604. For example, the sound signals may be segmented into windows of certain time periods, where each of the windows may overlap with adjacent windows. In the illustrated embodiment, the windows may have a time period of 5 seconds and each of the windows may overlap adjacent windows by 4.5 seconds. The averaged amplitudes of a window is determined by summing the squares of the amplitude of each recorded electronic sample of the time windows. In some embodiments, other calculation methods may be used to determine the average of a time window. For example, the lifeform presence detection determination system may calculate the average the sum of square (or 2Nth power) of the sound amplitude within each window.

In 608, the lifeform presence detection determination system compares the sum of square of amplitudes of each of the windows to a threshold value. In particular, the sum of square of amplitudes may be compared to the threshold value to determine whether any of the averaged amplitudes exceed the threshold value. Based on the determination of whether the sum of square of amplitudes exceeds the threshold value, the process 600 may determine whether a source of the sounds is inside the cabin of the vehicle or outside the cabin of the vehicle. If the sum of square of amplitudes exceeds the threshold value, the process 600 may proceed to 610 where the source of the sound is determined to be within the cabin of the vehicle. Based on the determination that the source of the sound is within the cabin of the vehicle, the result of the spectral response analysis process 600 indicates that a lifeform is within the cabin of the vehicle. If the sum of square of amplitudes remains below the threshold value, the process 600 may proceed to 612 where the source of the sound is determined to be outside of the cabin of the vehicle. Based on the determination that the source of the sound is outside of the cabin of the vehicle, the result of the spectral response analysis approach 600 may indicate that there is not a lifeform within the cabin of the vehicle. In particular, the threshold value may be selected based on an attenuation of a body of the vehicle, such that the sum of square of amplitudes that exceed the threshold value correspond to sounds that are likely to have originated within the cabin of the vehicle and the sum of square of amplitudes that are below the threshold value corresponds to sounds that are likely to have originated outside of the cabin of the vehicle.

SELECT EXAMPLES

Example 1 provides a method for detecting a lifeform including obtaining a plurality of sound signals captured by a plurality of microphones mounted to a vehicle; performing a spectral response analysis of the plurality of sound signals, the spectral response analysis based on frequency-based attenuation of the vehicle; determining, based on the spectral response analysis, whether a source of a sound captured by at least one of the plurality of microphones is located inside the vehicle; and generating a notification in response to determining that the source of the sound is located inside the vehicle.

Example 2 provides the method according to example 1, further including performing an internal versus external analysis of the plurality of sound signals that includes comparing a sound captured by a microphone mounted inside the vehicle to a corresponding sound captured by a microphone mounted to the exterior of the vehicle.

Example 3 provides the method according to example 1, further including performing a reverberation analysis of at least one of the plurality of sound signals, the at least one sound signal captured by a microphone mounted to an inside of the vehicle.

Example 4 provides the method according to example 3, where the reverberation analysis is based on reverberation characteristics of the vehicle interior.

Example 5 provides the method according to example 1, where the plurality of microphones includes at least three microphones mounted at different locations of the vehicle, the method further including performing triangulation analysis to identify a location of the source of the sound.

Example 6 provides the method according to example 1, further including performing an additional analysis procedure using at least a portion of the plurality of sound signals; summing a weighted result of the additional analysis procedure and a weighted a result of the spectral response analysis to generate a weighted sum; and determining whether a source of a sound captured by at least one of the plurality of microphones is located inside the vehicle based on the weighted sum.

Example 7 provides the method according to example 1, where the spectral response analysis includes applying a bandpass filter to one of the plurality of sound signals to generate a filtered sound signal, the bandpass filter corresponding to a range of frequencies attenuated by a body of the vehicle; averaging amplitudes of the filtered sound signal; and comparing the averaged amplitudes to at least one threshold.

Example 8 provides the method according to example 7, where averaging the amplitudes of the filtered sound signal includes grouping the filtered sound signal into a plurality of windows; and calculating an average amplitude for each of the plurality of windows.

Example 9 provides the method according to example 7, where the bandpass filter is a Chebyshev filter.

Example 10 provides the method according to example 7, where comparing the averaged amplitudes to at least one threshold includes comparing the sum of the squares of the averaged amplitudes to the at least one threshold.

Example 11 provides the method according to example 7, where the bandpass filter further corresponds to a range of frequencies emitted by the lifeform.

Example 12 provides a method for detecting a lifeform including obtaining a plurality of sound signals captured by a plurality of microphones mounted to a vehicle; performing a first analysis of the plurality of sound signals to determine whether, according to the first analysis, the sound signals indicate that a sound captured by at least one of the plurality of microphones is located inside the vehicle; performing a second analysis of the plurality of sound signals to determine whether, according to the second analysis, the sound signals indicate that the sound captured by at least one of the plurality of microphones is located inside the vehicle; combining a result of the first analysis and a result of the second analysis to generate an overall determination of whether the sound captured by at least one of the plurality of microphones is located inside the vehicle; and generating a notification in a response to the overall determination indicating that the sound captured by at least one of the plurality of microphones is located inside the vehicle.

Example 13 provides the method according to example 12, where the first analysis includes a spectral response analysis based on frequency-based attenuation of the vehicle.

Example 14 provides the method according to example 13, where the second analysis includes an internal versus external analysis of the plurality of sound signals that includes comparing a sound captured by a microphone mounted inside the vehicle to a corresponding sound captured by a microphone mounted to the exterior of the vehicle.

Example 15 provides the method according to example 14, further including performing a third analysis of the plurality of sound signals to determine whether, according to the third analysis, the sound signals indicate that the sound captured by at least one of the plurality of microphones is located inside the vehicle, the third analysis including one of triangulation analysis and reverberation analysis.

Example 16 provides the method according to example 12, where each of the first analysis and the second analysis provide a numerical result, and combining the result of the first analysis and the result of the second analysis includes calculating a weighted sum of the numerical results.

Example 17 provides a computer-readable media having instructions stored thereon, where the instructions, when executed by a device, cause the device to obtain a plurality of sound signals captured by a plurality of microphones mounted to a vehicle; perform a spectral response analysis of the plurality of sound signals, the spectral response analysis based on frequency-based attenuation of the vehicle; determine, based on the spectral response analysis, whether a source of a sound captured by at least one of the plurality of microphones is located inside the vehicle; and generate a notification in response to determining that the source of the sound is located inside the vehicle.

Example 18 provides the computer-readable media according to example 17, further including instructions to perform an internal versus external analysis of the plurality of sound signals that includes comparing a sound captured by a microphone mounted inside the vehicle to a corresponding sound captured by a microphone mounted to the exterior of the vehicle.

Example 19 provides the computer-readable media according to example 17, further including instructions to perform a reverberation analysis of at least one of the plurality of sound signals, the at least one sound signal captured by a microphone mounted to an inside of the vehicle.

Example 20 provides the computer-readable media according to example 17, further including instructions to perform triangulation analysis to identify a location of the source of the sound, where the plurality of microphones includes at least three microphones mounted at different locations of the vehicle.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

What is claimed is:

1. A method, comprising:

obtaining a plurality of sound signals captured by a plurality of microphones mounted to a vehicle, with the plurality of microphones including multiple interior microphones mounted to the interior of the vehicle and an exterior microphone mounted to the exterior of the vehicle;

selecting at least one analysis to perform from a plurality of analyses based at least in part on one or more properties of a cabin of the vehicle, a number of the plurality of microphones, and a position of each of the plurality of microphones, with the plurality of analyses including a first analysis and a second analysis, with the first analysis comprising a spectral response analysis based on frequencies of sounds associated with a lifeform and sound characteristics of the vehicle including frequency-based attenuation of sound propagating through the vehicle, and with the second analysis comprising an internal versus external analysis that comprises comparing a sound captured by an interior microphone of the multiple interior microphones to a corresponding sound captured by the exterior microphone;

performing the at least one analysis selected using at least a portion of the plurality of sound signals;

determining, based on at least one result of the at least one analysis selected, that a source of a sound captured by at least one microphone of the plurality of microphones is located inside the vehicle;

determining, based on at least one of (i) one or more thresholds for amplitude of sounds associated with the plurality of sound signals or (ii) presence of the source of the sound inside the vehicle, that a lifeform is present within the cabin of the vehicle in response to determining that the source of the sound is located inside the vehicle; and causing, by a processor, at least one of a first notification system or a second notification system to perform one or more operations notifying presence of the lifeform within the vehicle, with the first notification system being integrated into the vehicle and including a functional element of the vehicle, and with the second notification system being communicatively coupled to the vehicle and including a device for communications.

2. The method of claim 1, wherein the plurality of analyses further include a third analysis comprising a reverberation analysis of at least one sound signal of the plurality of sound signals, the at least one sound signal captured by an interior microphone of the multiple interior microphones.

3. The method of claim 2, wherein the reverberation analysis is based on reverberation characteristics of the interior of the vehicle.

4. The method of claim 1, wherein the plurality of microphones comprises at least three microphones mounted at different locations of the vehicle, and wherein the plurality of analyses further include a third analysis comprising a triangulation analysis to identify a location of the source of the sound.

5. The method of claim 1, further comprising:

performing an additional analysis from the plurality of analyses using at least another portion of the plurality of sound signals;

summing a weighted result of the additional analysis and at least one weighted result of the at least one analysis selected to generate a weighted sum; and determining whether the source of the sound captured by the at least one microphone of the plurality of microphones is located inside the vehicle based on the weighted sum.

6. The method of claim 1, wherein the spectral response analysis comprises:

applying a bandpass filter to one of the plurality of sound signals to generate a filtered sound signal, the bandpass filter corresponding to a range of frequencies attenuated by a body of the vehicle;

averaging amplitudes of the filtered sound signal; and comparing the averaged amplitudes to the one or more thresholds.

7. The method of claim 6, wherein averaging the amplitudes of the filtered sound signal comprises:

grouping the filtered sound signal into a plurality of windows; and calculating an average amplitude for each window of the plurality of windows.

8. The method of claim 6, wherein the bandpass filter is a Chebyshev filter.

9. The method of claim 6, wherein comparing the averaged amplitudes to the one or more thresholds comprises comparing a sum of squares of the averaged amplitudes to the one or more thresholds.

10. The method of claim 8, wherein the bandpass filter further corresponds to a range of frequencies emitted by the lifeform.

11. A method, comprising:

obtaining a plurality of sound signals captured by a plurality of microphones mounted to a vehicle, with the plurality of microphones including multiple interior microphones mounted to the interior of the vehicle;

selecting a plurality of analyses to perform based at least in part on one or more properties of a cabin of the vehicle, a number of the plurality of microphones, and a position of each of the plurality of microphones;

performing the plurality of analyses selected using at least a portion of the plurality of sound signals, wherein the performing the plurality of analyses selected comprises:

performing a first analysis of the plurality of sound signals to determine whether, according to the first analysis, the plurality of sound signals indicates that a sound captured by at least one microphone of the plurality of microphones is located inside the vehicle, with the first analysis comprising a spectral response analysis based on frequencies of sounds associated with a lifeform; and performing a second analysis of the plurality of sound signals to determine whether, according to the second analysis, the plurality of sound signals indicates that the sound captured by the at least one microphone of the plurality of microphones is located inside the vehicle;

combining a result of the first analysis and a result of the second analysis to generate an overall determination of whether the sound captured by the at least one microphone of the plurality of microphones is located inside the vehicle;

determining, based at least on one or more thresholds for amplitude of sounds associated with the plurality of sound signals, that a lifeform is present within the cabin of the vehicle in a response to the overall determination indicating that the sound captured by the at least one microphone of the plurality of microphones is located inside the vehicle; and causing, by a processor, at least one of a first notification system or a second notification system to perform one or more operations notifying presence of the lifeform within the cabin vehicle, with the first notification system being integrated into the vehicle and including a functional element of the vehicle, and with the second notification system being communicatively coupled to the vehicle and including a device for communications.

12. The method of claim 11, wherein the spectral response analysis is further based on sound characteristics of the vehicle including frequency-based attenuation of sound propagating through the vehicle.

13. The method of claim 12, wherein the second analysis comprises an internal versus external analysis of the plurality of sound signals that comprises comparing a sound captured by an interior microphone of the multiple interior microphones to a corresponding sound captured by a microphone mounted to an exterior of the vehicle.

14. The method of claim 13, wherein the performing the plurality of analyses selected further comprises:

performing a third analysis of the plurality of sound signals to determine whether, according to the third analysis, the sound signals indicate that the sound captured by the at least one microphone of the plurality of microphones is located inside the vehicle, the third analysis comprising one of triangulation analysis and reverberation analysis.

15. The method of claim 11, wherein the first analysis provides a first numerical result and the second analysis provides a second numerical result, and combining the result of the first analysis and the result of the second analysis comprises calculating a weighted sum of the first numerical result and the second numerical result.

16. A non-transitory computer-readable storage medium having instructions stored thereon, wherein the instructions, when executed by a device, cause the device to:

obtain a plurality of sound signals captured by a plurality of microphones mounted to a vehicle, with the plurality of microphones including multiple interior microphones mounted to the interior of the vehicle and an exterior microphone mounted to the exterior of the vehicle;

select at least one analysis to perform from a plurality of analyses based at least in part on one or more properties of a cabin of the vehicle, a number of the plurality of microphones, and a position of each of the plurality of microphones, with the plurality of analyses including a first analysis and a second analysis, with the first analysis comprising a spectral response analysis based on frequencies of sounds associated with a lifeform and sound characteristics of the vehicle including frequency-based attenuation of sound propagating through the vehicle, and with the second analysis comprising an internal versus external analysis that comprises comparing a sound captured by an interior microphone of the multiple interior microphones to a corresponding sound captured by the exterior microphone;

perform the at least one analysis selected using at least a portion of the plurality of sound signals;

determine, based on at least one result of the at least one analysis selected, that a source of a sound captured by at least one microphone of the plurality of microphones is located inside the vehicle;

determine, based on at least one of (i) one or more thresholds for amplitude of sounds associated with the plurality of sound signals or (ii) presence of the source of the sound inside the vehicle, that a lifeform is present within the cabin of the vehicle in response to determining that the source of the sound is located inside the vehicle; and cause at least one of a first notification system or a second notification system to perform one or more operations notifying the presence of the lifeform within the cabin of the vehicle, with the first notification system being integrated into the vehicle and including a functional element of the vehicle, and with the second notification system being communicatively coupled to the vehicle and including a device for communications.

17. The non-transitory computer-readable storage medium of claim 16, wherein the plurality of analyses further include a third analysis comprising a reverberation analysis of at least one of the plurality of sound signals, the at least one sound signal captured by an interior microphone of the multiple interior microphones.

18. The non-transitory computer-readable storage medium of claim 16, wherein the plurality of analyses further include a third analysis comprising a triangulation analysis to identify a location of the source of the sound, and wherein the plurality of microphones comprises at least three microphones mounted at different locations of the vehicle.

19. The method of claim 1, wherein the one or more properties of the cabin of the vehicle include at least one of a shape of the cabin, a size of the cabin, or one or more interior materials of the cabin.

* * * * *